(12) United States Patent
Ward, II et al.

(10) Patent No.: US 6,477,505 B2
(45) Date of Patent: *Nov. 5, 2002

(54) ELECTRONIC PARKING METER LOCKING SYSTEM

(76) Inventors: Seth Ward, II, 14 Glenleigh, Little Rock, AR (US) 72227; William C. Kiehl, 1419 Lands End North, Russellville, AR (US) 72801; R. Todd Brown, 135 Dawn Cir., Russellville, AR (US) 72801

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 61 days.

(21) Appl. No.: 09/212,542

(22) Filed: Dec. 16, 1998

(65) Prior Publication Data

US 2001/0013010 A1 Aug. 9, 2001

Related U.S. Application Data

(60) Provisional application No. 60/102,057, filed on Sep. 28, 1998.

(51) Int. Cl.⁷ ............................................. G06F 17/60
(52) U.S. Cl. ........................... 705/13; 70/277; 70/278.2
(58) Field of Search ............................. 705/13, 1, 400, 705/418; 340/932.2, 825.34, 870.02; 194/217, 215, 216, 229, 900; 368/90, 6, 7, 89; 70/69, 277, 278, 279, 283

(56) References Cited

U.S. PATENT DOCUMENTS

| | | | |
|---|---|---|---|
| 3,795,417 A | * 3/1974 | Cohen | 292/114 |
| 4,426,862 A | 1/1984 | Yamada et al. | 70/69 |
| 5,065,156 A | * 11/1991 | Bernier | 340/932.2 |
| 5,204,663 A | * 4/1993 | Lee | 340/825.34 |
| 5,259,491 A | * 11/1993 | Ward, II | 194/350 |
| 5,287,098 A | * 2/1994 | Janssen | 340/5.65 |
| 5,552,777 A | * 9/1996 | Gokcebay et al. | 340/5.54 |
| 5,605,066 A | * 2/1997 | Hurskainen | 70/278 |
| 5,614,892 A | * 3/1997 | Ward, II et al. | 340/870.02 |
| 5,701,828 A | * 12/1997 | Benore et al. | 109/56 |
| 5,732,812 A | * 3/1998 | Grainger et al. | 194/217 |
| 5,805,083 A | * 9/1998 | Sutton et al. | 340/932.2 |
| 5,839,307 A | * 11/1998 | Field et al. | 70/283 |
| 5,848,541 A | * 12/1998 | Glick et al. | 70/278 |

FOREIGN PATENT DOCUMENTS

JP 06-1333068 A * 5/1994 ............ 379/102.03

OTHER PUBLICATIONS

"USSR: Germano–made safes offered on the Soviet market"; Kommersant, Jul. 22, 1991, p. 11. (Abstract Only).*

* cited by examiner

Primary Examiner—Edward R. Cosimano

(57) ABSTRACT

An electro-mechanical lock on the coin vault of a parking device is controlled by the electronic components of the parking meter. Combining the electro-mechanical lock with a standard mechanical lock provides additional security in that two devices must be employed to open the meter. This provides greater security for coin collection without the need to provide separate circuitry to control the lock. Additionally, the electro-mechanical lock can be triggered by a smart card which also triggers an audit of the meters activity, providing an audit trail for coin collection.

21 Claims, 6 Drawing Sheets

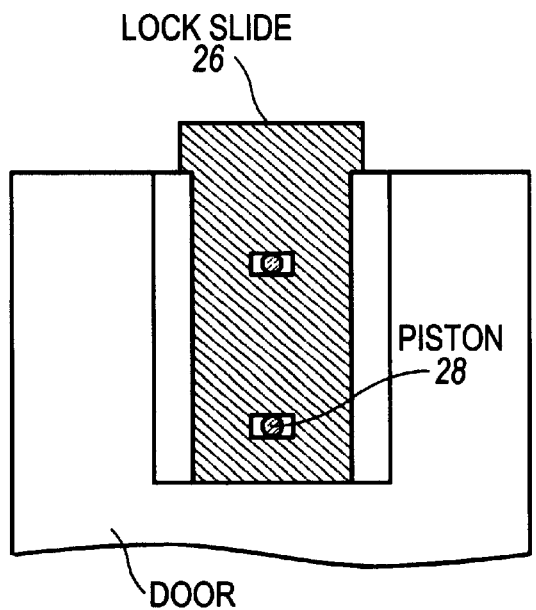
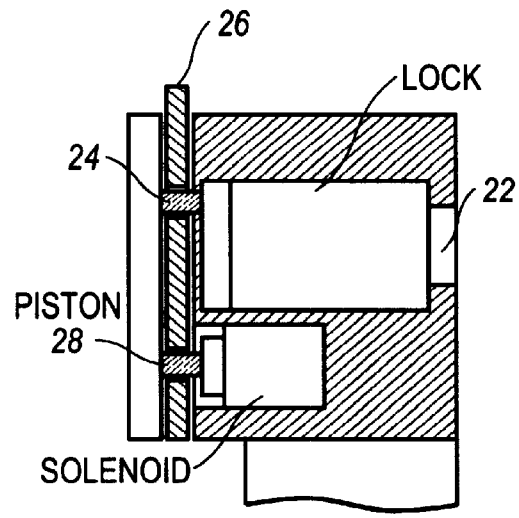
FIG. 2a
FIG. 2b
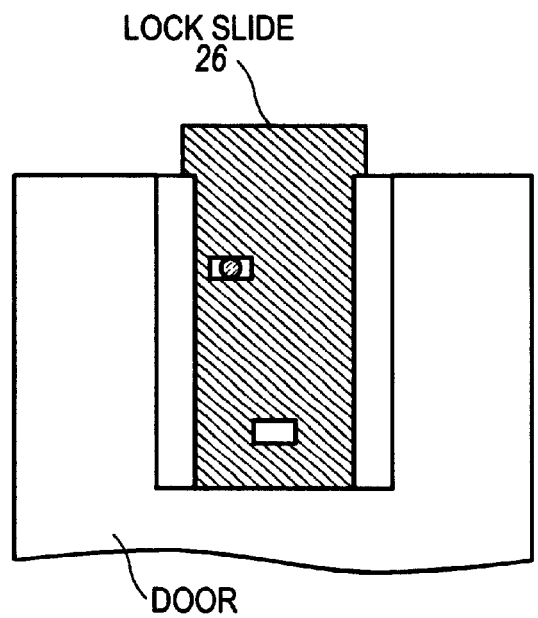
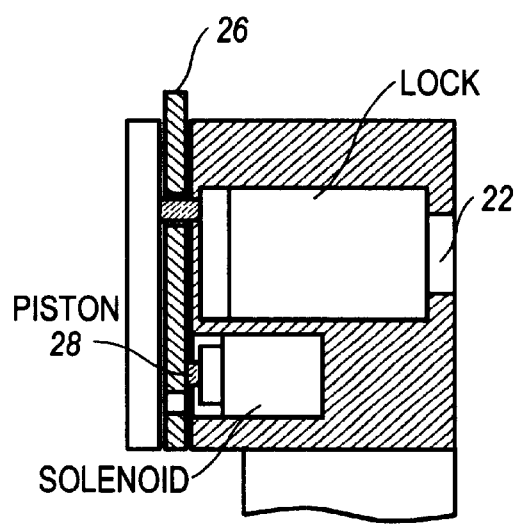
FIG. 2c
FIG. 2d

ELECTRONIC PARKING METER LOCKING SYSTEM

CROSS-REFERENCE TO RELATED APPLICATION

This application claims priority from 60/102,057, filed Sep. 28, 1998, which is hereby incorporated by reference.

BACKGROUND AND SUMMARY OF THE INVENTION

The present invention relates to electronic parking meters and other parking devices, and to securing them from vandalism and theft.

Background: Security from Vandals in Parking Devices

Parking devices generally receive payment (e.g., coins, tokens, or more recently, electronic payment cards) and, in response, indicate the length of time a vehicle is allowed to remain in a given parking space. There are generally two types of parking devices: parking meters and central parking collectors.

Parking meters, as the terminology is used in this application, are designed to be placed adjacent to one or more parking spaces and will only accommodate a small number of vehicles. Parking meters can be placed adjacent to each parking space, shared between two adjacent parking spaces, or, where two rows of parked cars face each other, one meter may serve a maximum of four vehicles.

Central parking collectors, on the other hand, are designed for situations where one central location may serve a larger number of parking spaces, such as a single machine which handles all the cars in a large lot.

While these two types of systems differ in many ways (e.g., parking meters are generally battery- or solar-powered, while central parking collectors may have an external power supply), they both share the need to provide a secure area for the collection of money, and to allow only authorized personnel to remove the money.

Although the use of electronics in parking devices has reduced the need for cash handling by allowing electronic payments, many parking devices still accept cash, so the threat from vandals is a real issue in the design of these products. Meters are designed to withstand battering and prying, but previously thieves could drill out the lock on the vault, thus gaining access to the stored cash. With this in mind, manufacturers have been forced to utilize better, more expensive, locks than would otherwise be used.

One lock, produced by Medeco, is an electro-mechanical lock, controlled by its own separate electronic circuit and therefore openable only by, e.g. a key in combination with an electronic component, such as a hand-held computer which communicates with the electronics.

Background: Security from Employee Theft in Parking Devices

In addition to protecting a meter from vandals, various methods have been employed in the past to protect against employee theft when coins are collected from the meters. The meters are generally emptied by an employee who goes from meter to meter opening them and emptying out any collected coins. With a large number of small coins providing an easily concealable target, and with generally no other persons to monitor the honesty of the collector, many municipalities face the problem of suspecting that large amounts of their revenue from parking meters are being stolen, but not having the means to prove that assertion.

Electronic Parking Device Auditing/Vault Door Locking System

The present application discloses the use of an electro-mechanical lock combination on the parking device vault door. This involves the use of a key-controlled lock used in conjunction with an electrically-controlled lock which interfaces with the electronic circuitry of the parking meter itself.

This application further discloses two levels of security. The device used to control the electrically-controlled lock can be programmed to automatically download the activity of the meter, including the amount of cash collected, at the same time the coins are removed. This provides an audit trail which can be used to detect theft of coins by the personnel who collect from the meters. A lower level of security does not tie an electronic audit to the opening of the vault.

The disclosed innovations, in various embodiments, provide one or more of the following advantages:

- increased security from vandals removing cash in meter;
- increased detection of employee theft;
- two devices are necessary for opening meter, making the loss or theft of one device less critical to preserving integrity;
- mechanical portion of locks can be less expensive;
- drilling out lock doesn't open vault;
- no additional internal circuitry necessary to control lock;
- no additional electronics necessary to activate lock;
- operating costs are lower;
- production costs are lower.

BRIEF DESCRIPTION OF THE DRAWING

The disclosed inventions will be described with reference to the accompanying drawings, which show important sample embodiments of the invention and which are incorporated in the specification hereof by reference, wherein:

FIGS. 2a through 2d show back and side views of the preferred embodiment of the electro-mechanical lock combination.

FIGS. 4a and 4b show external views of respective embodiments of parking meter vaults and various types of electronic key, while

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overview

A parking meter (or central parking collector) which uses the disclosed system must have a way to receive and store physical payments received, and the electronic circuitry to control the parking device, i.e., to recognize payments and indicate parking time purchased.

Electronic payments may be made by smart cards—a stored memory card which is generally the size of a credit card. These cards can contain both stored programming and user data and are becoming more common in various financial transactions. In parking meters, the physical payments will generally be coins, although tokens could also be used, and in central parking collectors, paper money can also be involved. References to coins in the following discussion is assumed to include other physical (non-electronic) forms of payment.

The portion of the housing which stores the coins is herein referred to as the vault and the opening through which cash may be removed from the device is referred to as the vault door, although both structures may take many shapes and forms. It is further necessary to have a means to communicate with the parking device when an authorized person wants to open the vault door and remove cash from the device.

Figure 1:
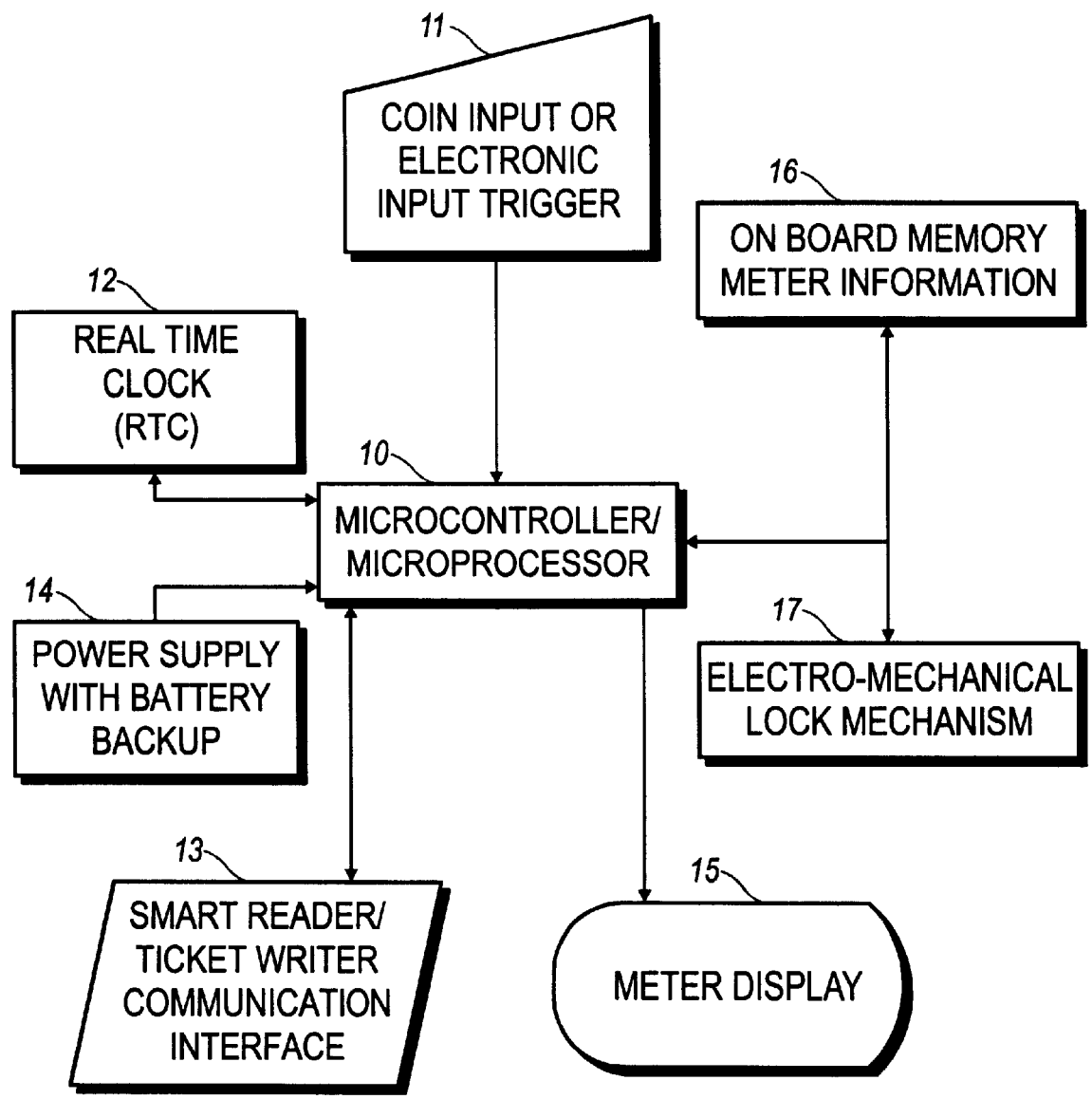
FIG. 1 shows a block diagram of the electronic circuitry involved in a parking meter using the disclosed lock.

FIG. 1 shows a block diagram of a sample electronic parking meter according to the present invention. The meter includes a microcontroller ($\mu$C) or microprocessor ($\mu$P) 10 (e.g. an 8048 or 8051) connected to both a real time clock 12 and a power supply with a battery backup system 14.

A type of payment, such as coins or a debit card, is inserted into the meter through the coin or electronic input trigger 11 by the parking space user, or an automatic logging system (similar to the systems presently used to pay toll road fees without stopping) can trigger the purchase of time. The time and amount of the transaction is recorded by the $\mu$C or $\mu$P 40 in the memory 16 provided in the meter. The meter display 15 informs the user of the amount of time purchased. Communications interface 13 provides a means to change the programming or interrogate the meter regarding its activity. The electro-mechanical lock mechanism 17 is at least partially controlled by the processor 10 in response to input received by the communications interface 13.

The system can be used with two levels of security. In a first level, which has the highest security, a system manager programs a communications device to act as the electronic key, i.e. to unlock the electrically-controlled portion of the lock. At the same time, security control information can be entered, e.g., to limit the time during which the communications device is useable, or to limit the number of transactions or locations for which the device may be used, or to provide an employee password which must be entered before use. When the communications device is used to open a meter, the meter is prompted to download the amount of cash that the meter has collected, the meter's identification, date, time, and the employee's identification, as well as any other information which is desired. This makes it much harder for employees to successfully pilfer coins as they collect them.

If this level of security is not needed, the communications device may simply be used to open the electrically-controlled lock without an audit being performed. In either case, once the electrically-controlled portion of the lock is opened, a mechanical key can be used to provide access to the vault.

Housing and Lock: First Embodiment

Figure 4A:
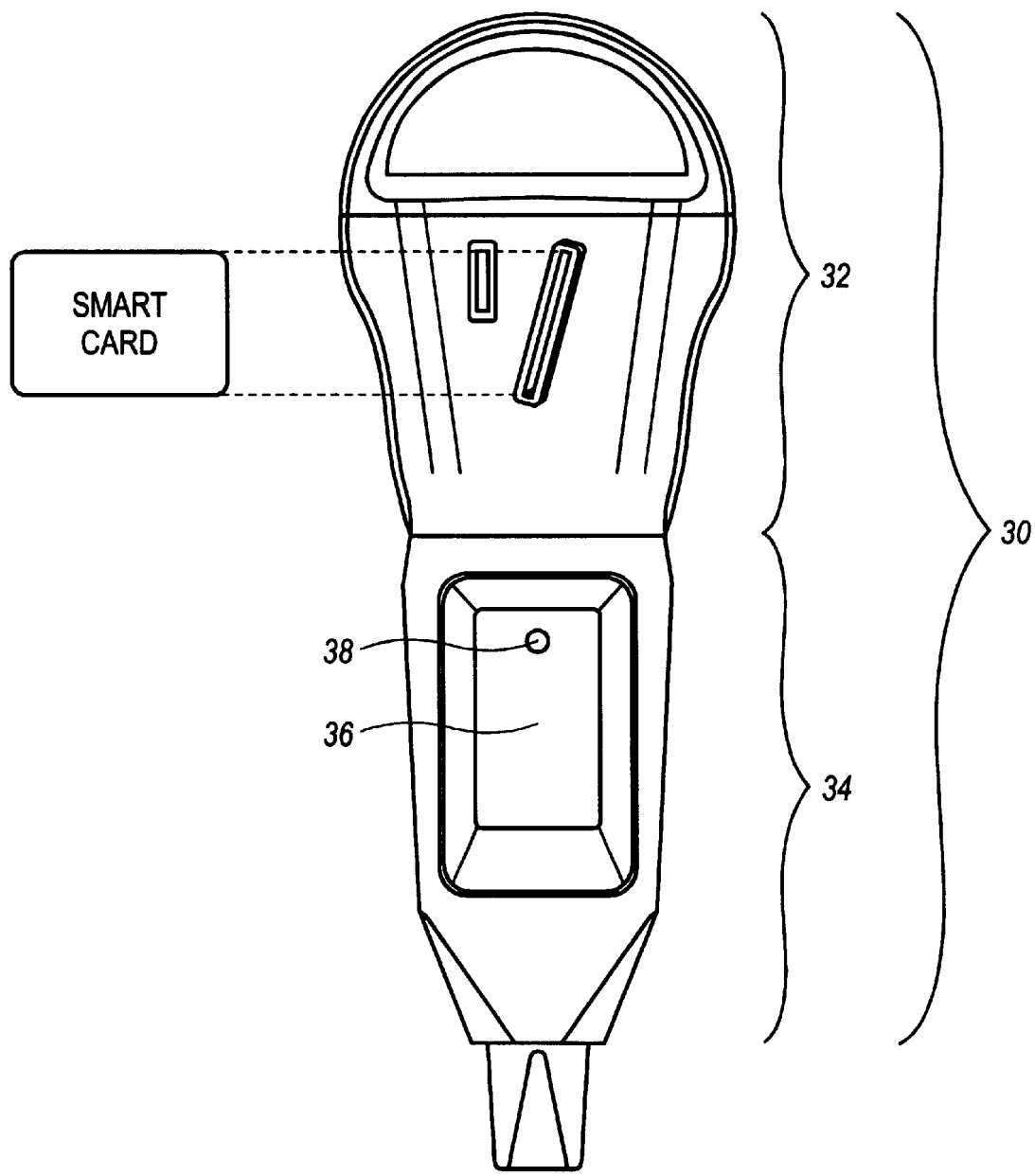

The presently preferred embodiment for a meter which accepts both coins and smart cards is shown in FIG. 4a. The external housing 30 of the parking meter includes a mechanism housing 32, which encloses the working parts of the meter, and a separate vault 34, enclosing a coin canister, where collected coins are retained after their insertion. A squared vault door 36 is hinged on its lower edge and opens outwardly to provide access to the coin canister. The electro-mechanical lock 38 is provided to hold the vault door in a closed position.

In the presently preferred embodiment, the electrically-controlled portion of the lock is a solenoid-controlled piston, which in the resting position interferes with the operation of a regular mechanical lock, shown in FIGS. 2a–2d. FIGS. 2a–2b are back and side views respectively of the locking mechanism in a locked position. In a normal keyed lock, insertion of the proper key into lock 22 allows the lock mechanism to turn. This moves pin 24, which pushes the sliding mechanism 26 in and out. In these figures, however, piston 28 is engaged in the sliding mechanism, so that even with the proper key inserted, the slide will not move and the lock mechanism will not turn. The slide remains immobilized even if lock 22 is drilled out, providing an added level of protection.

In FIGS. 2c–2d, the back and side views show the same lock as it is in the process of opening. The electronic key has been activated and the solenoid retracts the piston 28, unblocking the slide mechanism 26. The lock is now free to turn, which in turn moves the slide and allows the door to open.

Because of the rectangular shape of the vault door in this embodiment and the subsequent positioning of the lock near the top of the vault, the electro-mechanical lock receives added protection from drilling attempts from the mechanism housing directly above the vault.

Housing: Alternate Embodiment

Figure 3:
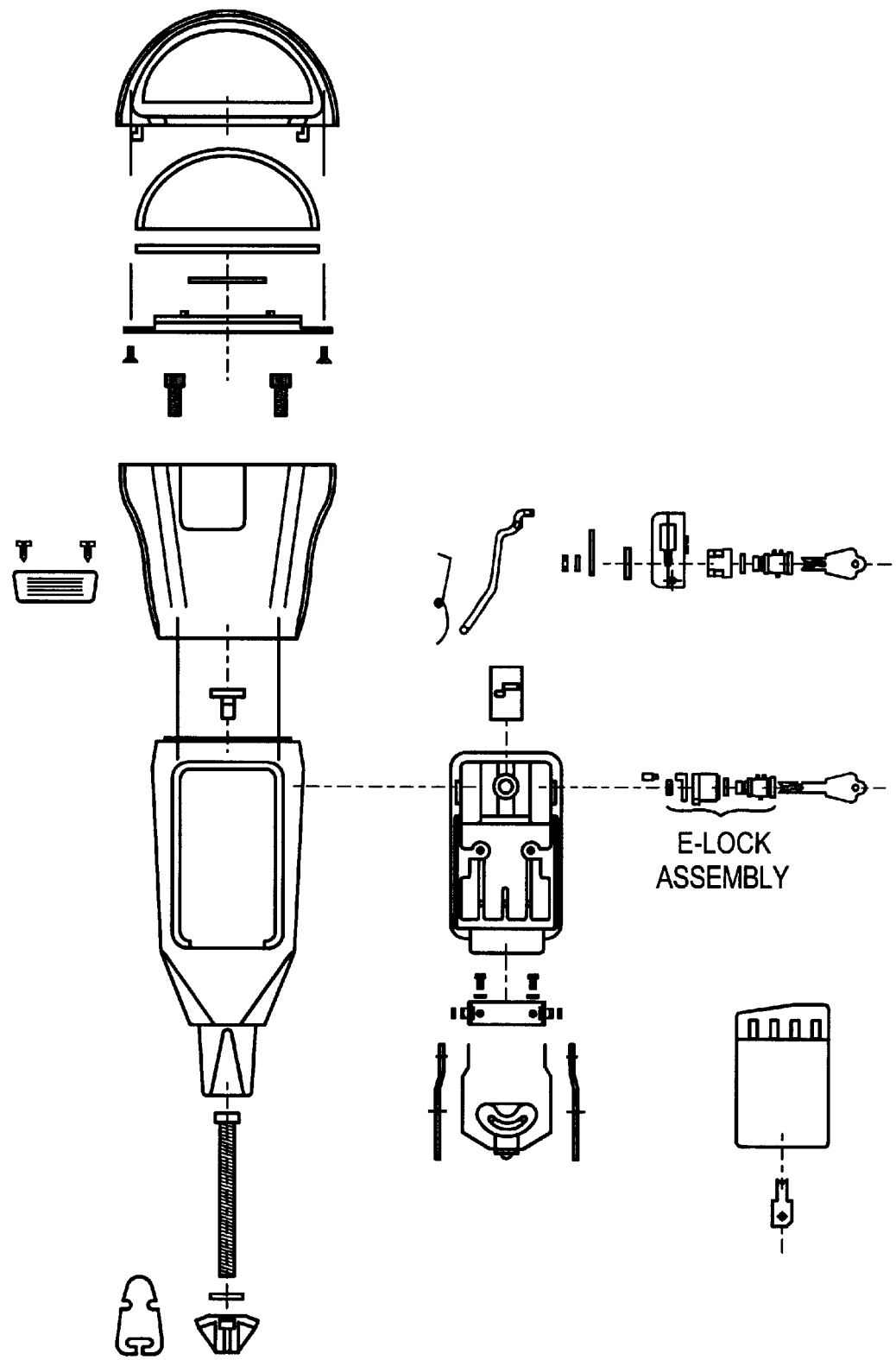
FIG. 3 shows an exploded view of the housing of an exemplary parking meter and vault.

FIG. 3 is an exploded drawing of the meter housing with vault and lockable vault door. This drawing shows an alternate embodiment of the vault door, wherein the door is held in place by a protrusion on its lower edge which fits inside the vault. In this embodiment, the door must be removed from the meter whenever it is opened.

Housing: Alternate Embodiment

Figure 4B:
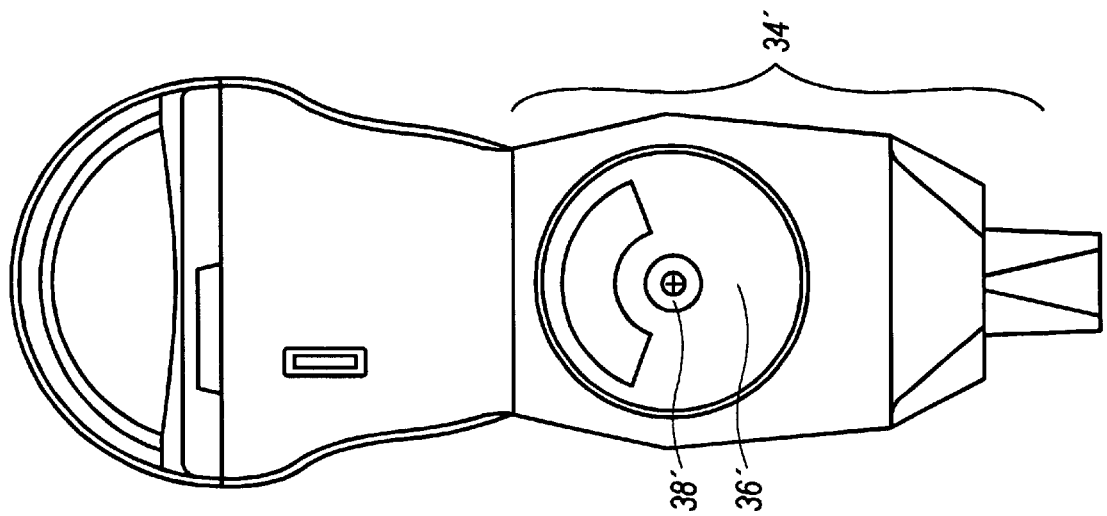
Figure 4B:
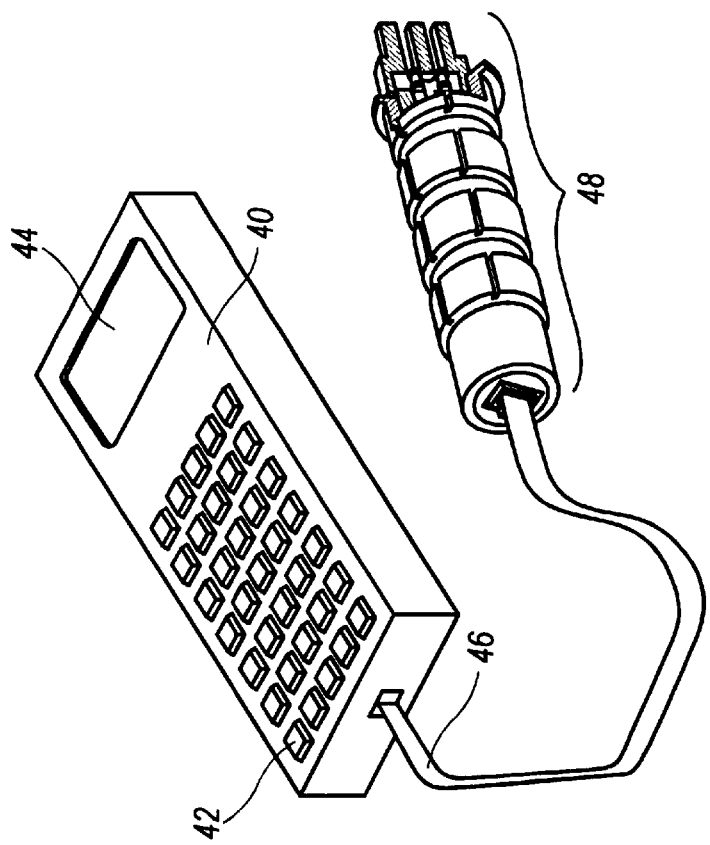

In a less preferred embodiment, shown in FIG. 4b, the vault 34' has a slightly more rounded shape, while vault door 36' is circular and must be removed from the meter when opened. The location of the lock 38' in the center of the door does not offer the added protection against drilling that the above embodiments do.

Lock: Alternate Embodiment

In a less preferable embodiment, the mechanical lock and electro-mechanical locks are completely separate from each other and do not interact with each other.

Electronic Key—First Embodiment

Figure 4C:
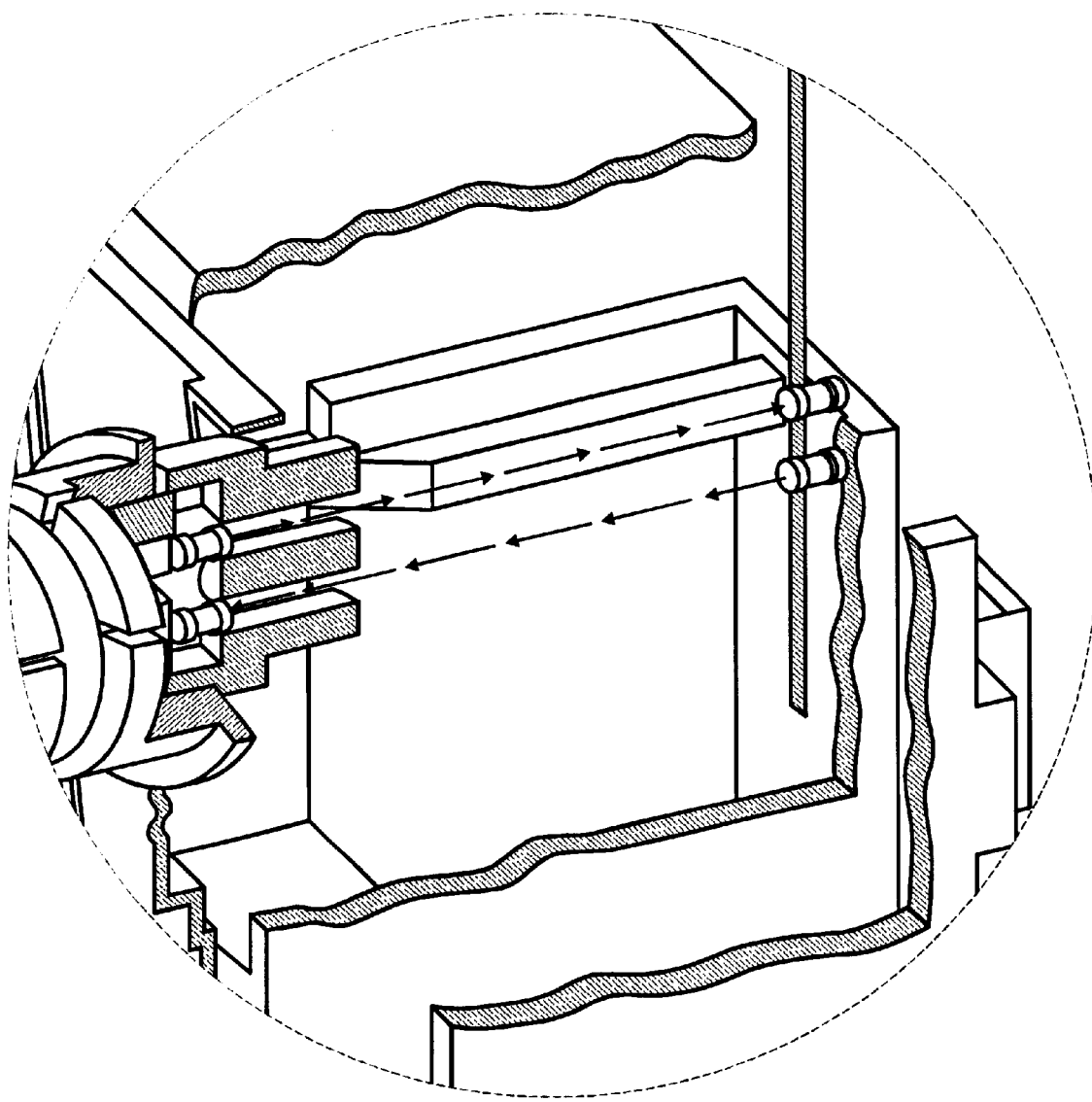
FIG. 4c shows a close-up view of the wireless communications used in FIG. 4b.

Seen in FIG. 4b is an example of the communications device which is presently preferred for use in coin-only meters. In this example, a hand-held processor 40 with a keypad 42 and display 44 is attached by a cable 46 to an infrared probe 48. When the infrared probe is docked into the coin slot, communications with the internal circuitry can be established via IR linkages, shown in close-up in FIG. 4c. This type of communications device is already in use to collect data from a meter regarding its usage or to issue citations, so adding protocol to unlock the meter is a matter of programming, rather than adding hardware. Of course, this type of communications is not limited to infrared technology, nor to communications only through the coin slot but can utilize, for example, radio frequency (RF), or other electromagnetic signals, or access the internal circuitry through a smart card slot, or through the window in the housing.

Electronic Key—Second Embodiment

An alternate embodiment can be used in meters which accept both coins and electronic payments, such as smart cards. A master smart card acts as the electronic key and is programmed to activate the electrically-controlled lock. This is a lower-cost solution in that it does not require the use of an expensive communications device such as discussed above, but can perform the same functions, including collecting an audit.

Electronic Key—Alternate Embodiments

Of course, other types of communications are possible. For example, a probe can be used to make a mechanical connection to circuitry inside either the coin slot or the smart card slot.

Alternatively, contactless cards are becoming popular in transit application, such as buses and subways, and this type of card could be used in parking meter systems. Since the reader in contactless applications has high power requirements, it could not remain constantly active, as is typical. However, by requiring the user to insert the contactless card into a slot, this action could activate an extremely close range transmitter and receiver within the slot. This would require very little power, as the card would be exactly positioned and very close to the card reading apparatus.

Further details of some of the various means of communications are discussed further in other patents and applications commonly owned by the assignee of this applications, such as U.S. Pat. No. 5,614,892, issued Mar. 25, 1997 and application U.S. Ser. No. 08/847,428, filed Apr. 24, 1997, now abandoned, both of which are hereby incorporated by reference.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In an alternate embodiment, the electro-mechanical lock can take different forms from the disclosed piston and solenoid.

Alternatively, the vault can be made as one piece with the rest of the parking meter housing, or different shapes and sizes can be used in the design.

What is claimed is:

1. A parking device, comprising:
   an input device to receive payment;
   an electronic circuit, connected to said input device to validate said payment and to calculate time purchased;
   a vault, connected to said input device, in which payment is stored, said vault having a vault door which provides external access to said vault;
   a mechanical lock which secures said vault door in a closed position;
   an electrically-controlled lock which secures said vault door in a closed position, said electrically-controlled lock being controlled by said electronic circuit.

2. The parking device of claim 1, wherein said electrically-controlled lock, in its unpowered position, obstructs the opening of said mechanical lock.

3. The parking device of claim 1, wherein said electronic circuit comprises a microcontroller.

4. The parking device of claim 1, further comprising a smart card, wherein use of said smart card to open said parking device triggers a download of information from said parking device.

5. The parking device of claim 1, wherein said parking device is a central collection unit for a parking lot.

6. A parking device, comprising:
   electronic circuitry, connected to a payment receptacle, to recognize payment received and indicate parking time purchased;
   a vault, connected to said payment receptacle, in which payment received by said parking device is stored, said vault having a vault door which provides external access to the contents of said vault;
   an electro-mechanical lock which is at least partly controlled by a signal from said electronic circuitry.

7. The parking device of claim 6, wherein said parking device is a parking meter for a single parking space.

8. The parking device of claim 6, wherein a hand-held transmitter is used to contact said electronic circuitry and unlock said electro-mechanical lock.

9. The parking device of claim 6, wherein a smart card is used to contact said electronic circuitry and unlock said electro-mechanical lock.

10. A fabrication method for a parking device, comprising the steps of:
   (a.) programming electronic circuitry to recognize a payment received and to display allowed parking time in response to the receipt of said payment;
   (b.) enclosing said electronic circuitry in a housing, said housing including a vault for storing payment received, said vault having a vault door to provide external access to said vault;
   (c.) locking said vault door with both a mechanical lock and an electrically-controlled lock which is at least partially controlled by said electronic circuitry.

11. The method of claim 10, wherein said vault door is rectangular.

12. The method of claim 10, wherein said step (c.) comprises installing said electrically-controlled lock so that it interferes with the action of said mechanical lock.

13. A method for operating a parking device, comprising the steps of:
   (a.) using electronic circuitry to recognize payment received by said parking device and to display a corresponding parking time purchased;
   (b.) storing at least a portion of said payment in a vault section of said parking device having a vault door to provide external access to said vault;
   (c.) locking said vault door with a mechanical lock and an electronically-controlled lock which in its unpowered position maintains said vault door in a locked state and which is controlled by a signal from said electronic circuitry.

14. The parking device of claim 13, further comprising:
   (d.) opening said electronically-controlled lock with a communications device which also triggers a download of information from said parking device.

15. The method of claim 13, wherein said step (c.) comprises installing said electronically-controlled lock such that it interferes with the action of said mechanical lock.

16. A vending device, comprising:
   an input device to receive payment;
   an electronic circuit, connected to said input device to validate said payment;
   a vault, connected to said input device, in which payment is stored, said vault having a vault door which provides external access to said vault;
   a mechanical lock which secures said vault door in a closed position;
   an electrically-controlled lock which secures said vault door in a closed position, said electrically-controlled lock being controlled by said electronic circuit.

17. The vending circuit of claim 16, wherein said vending device is a parking meter.

18. A fabrication method for a vending device, comprising the steps of:
- (a.) programming electronic circuitry to recognize a payment received by said vending device;
- (b.) enclosing said electronic circuitry in a housing, said housing including a value for storing payment received, said vault having a vault door to provide external access to said vault;
- (c.) locking said vault door with both a mechanical lock and an electrically-controlled lock which is at least partially controlled by said electronic circuitry.

19. The method of claim 18, wherein said step (c.) comprises installing said electrically-controlled lock so that it interferes with the action of said mechanical lock.

20. A method for operating a vending device, comprising the steps of:
- (a.) using electronic circuitry to recognize payment received by said vending device;
- (b.) storing at least a portion of said payment in a vault section of said vending device having a vault door to provide external access to said vault;
- (c.) locking said vault door with a mechanical lock and an electronically-controlled lock which in its unpowered position maintains said vault door in a locked state and which is controlled by a signal from said electronic circuitry.

21. The vending device of claim 20, further comprising:
- (d.) opening said electronically-controlled lock with a communications device which also triggers a download of information from said vending device.

* * * * *

UNITED STATES PATENT AND TRADEMARK OFFICE
CERTIFICATE OF CORRECTION

PATENT NO. : 6,477,505 B2  Page 1 of 1
DATED : November 5, 2002
INVENTOR(S) : Seth Ward II, William C. Kiehl and R. Todd Brown It is certified that error appears in the above-identified patent and that said Letters Patent is hereby corrected as shown below:

Title page,
Item [60], Related U.S. Application Data, delete the following, "Provisional application No. 60/102,057, filed on Sep. 28, 1998." and replace with
-- Provisional application No. 60/102,057, filed on Sep. 28, 1998; Provisional application No. 60/092,490, filed on July 8, 1998. --

Column 1,
Lines 6-7, delete "this application claims priority from 60/102,057, filed Sep. 28, 1998, which is hereby incorporated by reference." and replace with -- This application claims priority from 60/102,057, filed Sep. 28, 1998 and from 60/092,490, filed July 8, 1998, which are hereby incorporated by reference. --

Signed and Sealed this

Ninth Day of September, 2003

JAMES E. ROGAN
*Director of the United States Patent and Trademark Office*